H. W. CHENEY.
ENGINEER'S VALVE.
APPLICATION FILED JULY 22, 1912.

1,116,801.

Patented Nov. 10, 1914.

WITNESSES-
W. H. Lieber
Chas. L. Byron

INVENTOR-
H. W. Cheney
BY
ATTORNEY.

UNITED STATES PATENT OFFICE.

HERBERT W. CHENEY, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

ENGINEER'S VALVE.

1,116,801.  Specification of Letters Patent.  Patented Nov. 10, 1914.

Application filed July 22, 1912. Serial No. 711,335.

*To all whom it may concern:*

Be it known that I, HERBERT W. CHENEY, a citizen of the United States, residing at Milwaukee, in the county of Milwaukee and State of Wisconsin, have invented a certain new and useful Improvement in Engineers' Valves, of which the following is a specification.

This invention relates to improvements in the construction of engineers' valves adapted for use in controlling the air brakes of railroad cars.

The object of the invention is to provide an engineer's valve of the puppet valve type, which is simple in construction, efficient in operation, and in which the wear and leakage between the valves and their seating surfaces will be reduced to a minimum.

A clear conception of one embodiment of the invention may be had by referring to the drawing accompanying and forming part of this specification in which like reference characters designate the same or similar parts in the various views.

Figure 1 is a central vertical section through an engineer's valve and operating stem. Fig. 2 is a transverse vertical section through the valve disclosed in Fig. 1 looking toward the left. Fig. 3 is a bottom view of the intermediate member or valve operating block.

The valve casing consists of a base 8, an intermediate casing portion 7 and a valve cap 2, the three casing elements being united by means of bolts 3 passing through lugs formed on the members. The upper portion of the valve cap 2 has a bored recess formed therein in which the socket of the operating handle 1 is adapted to fit. The cap 2 is bored to receive the upper end of the operating stem 4, the joint between the stem 4 and cap 2 being packed by means of a packing 5 and washer 50, whereby the escape of air from the interior of the cap 2 to atmosphere is prevented. Quick pitch screw threads 6 are formed upon the mid portion of the operating stem 4 and extend through the chamber formed in the interior of the cap 2. The outer diameter of the threaded portion of the stem 4 is greater than that of the end portions thereof. The ends surfaces of the threaded portion coact with surfaces of the washer 50 and casing portion 7 respectively, thereby locking the stem 4 against motion along its axis. The lower end portion 26 of the operating stem 4 is fitted into a central recess formed in the intermediate portion 7 of the casing. A spring 24 coacts with its upper end against the lower end of the portion 26 of the stem 4, and with its lower end against the bottom of a recess formed in the base 8. The spring 24 tends to force the stem 4 upwardly, thereby assisting the packing of the joint between the stem 4 and cap 2.

The intermediate valve operating member or block 9, which is constructed of a special self-lubricating metal, is provided with quick pitch internal screw threads adapted for coaction with the quick pitch screw threads 6 of the stem 4. The pitch of the threads 6 is such that a partial rotation of the stem 4 by means of the operating handle 1 will cause the block 9 to travel through considerable distance along the axis of the stem 4. The oil pan 11 which contains felt matting or other suitable oil retaining material 12, is secured to the upper end of the block 9 and has a port 27 leading from its interior to the screw threads 6. The lug 14 of the block 9 is provided with a bore within which the stationary stem or guide 10 has a sliding fit. The guide 10 is fixed to the intermediate portion 7 of the valve casing and positively prevents rotation of the block 9 relative to the valve casing, when the stem 4 is in its normal position within the block 9. The projection 29 is formed in one with the block 9 and extends radially away from the axis of the block. The projection 29 is adapted to move in line with the axis of the puppet valve 35 as the block 9 is moved. The hook lug 13 of the block 9 extends away from the block in a direction opposite to that of the lug 14 and is adapted to move in line with the puppet valve 20 as the block 9 is moved.

The valve 20 is adapted to control a port leading from the interior of the intermediate portion 7 through the removable valve seat 19 to the chamber 21 formed in the base 8. The stem 28 of the valve 20 extends parallel to the stem 4 and in line with the projection 13 of the block 9. The upper end of the stem 28 is screw threaded to receive the nuts 16 which are locked to the stem 28 at a point slightly above the hook lug 13 of the block 9. The lower portion of the stem 28 is inclosed within a close-fitting bushing 82 which is held against an upper surface of the valve 20 by means of a nut 85. The nuts 16, 85, on the stem of the valve 20, in effect form a recess on the valve stem within which the hooked projection 13 engages this stem. The valve 20 at the lower end of the stem 28 is provided with a removable leather seating portion 18 in the form of a disk which bears directly upon the removable seat 19 of the base 8 and is kept in contact therewith by a cone shaped helical spring 17. The spring 17 coacts with its lower end against an upper surface of the valve 20, and with its upper end against a lower surface of the intermediate portion 7. The valve 20 is provided with a cylindrical portion of short axial extent formed directly adjacent the leather seating portion 18 and closely fitting the bore of the seat 19, thus forming a combined puppet and piston valve. Guides 22 formed at the lower end of the valve 20 also closely fit the bore of the seat 19. The chamber 21 below the valve 20 is provided with a port 23 which is normally connected to atmosphere. The chamber directly above the valve 20 is open to the interior of the valve cup 2 through a series of ports 15.

The valve 35 is adapted to control a port leading from the interior of the intermediate casing portion 7 through the removable valve seat 37 to the interior of the cap 2. The valve stem 32 is inclosed within a close-fitting bushing 83 which is held in place by a nut 84. The valve 35 is provided with a leather seating portion 34 in the form of a disk, which surrounds the valve stem 32 and is held in contact with the seat 37 by means of a cone shaped helical spring 33, the upper end of which bears directly against the back of the valve 35 and the lower end of which coacts with an upper surface of the base 8. The valve 35 is provided with a cylindrical portion of short axial extent formed directly adjacent the seating portion 34 and closely fitting the bore of the seat 37. Guides 36 formed in one with the valve 35 also closely fit the bore of the seat 37 and have upper surfaces which are directly below and in line with the projection 29 formed on the block 9, so that downward travel of the block 9 will cause the valve 35 to be pushed away from its seat. The chamber below the valve 35 is connected with the passage 39 formed through one of the downwardly projecting connecting portions 25 of the base 8 by means of ports 38.

The passage 40 formed in a second downwardly projecting connecting portion 25 of the base 8, communicates directly with the interior of the cap 2 through a conduit 31 which pierces the intermediate portion 7 of the valve casing.

During the operation of the valve the operating handle 1 is given a partial rotation in either direction, from the mid-position shown, causing the block 9 which is fixed against rotation by the guide 10, to travel either upwardly or downwardly along the stem 4. If the rotation of the stem is in a clockwise direction, the quick pitch screw threads 6 will cause the block 9 to move upwardly. Until such time when the lug 13 comes in contact with the lower surface of the nuts 16 secured to the stem 28 of the puppet valve 20, there will be no motion of the valve 20. After the lug 13 contacts with the nut 16, further upward travel of the block 9 will cause the seating portion 18 of the puppet valve 20 to leave its seat 19. Further motion of the valve 20 will eventually cause the piston portion of the valve to leave the bore of the seat 19 and permit passage of air past the valve seat 19. The opening or lifting of the valve 20 is in direct opposition to the normal downward pressure of the helical spring 17. By rotating the stem 4 in an anti-clockwise direction, the block 9 will be forced downwardly by the quick pitch screw threads 6. Until such time when the lug 29 comes in contact with the upper horizontal surface of the guides 36, there is no motion of the valve 35 away from its seat 37. If, however, the anti-clockwise rotation of the stem 4 is continued after contact of the lug 29 with the guides 36 is had, the lug 29 will force the seating portion 34 of the valve 35 away from the seat 37 in opposition to the normal upward pressure of the spring 33. The piston portion of the valve 35 eventually leaves the bore of the seat 37 and opens communication between the interior of the valve cap 2 and the passage 39.

It will be noted that the valves 20, 35, are interchangeably opened, the term "interchangeably" as used herein designating the opening of the valves one at a time, and only one valve being open at any time. It will also be noted that by forming the puppet valves 20, 35, with cylindrical or piston portions directly adjacent the leather seating portions 18, 34, thereof, the valves are given lap. By this is meant that the valves must be made to travel a fixed distance before actual communication between the chambers on opposite sides of the valve exists.

By providing the valves 20, 35, with replaceable leather seating portions 18, 34, a simple and easily repaired valve is provided. The seating portions can be removed by removal of the sleeves 82, 83, which can be easily accomplished by unscrewing the nuts 16, 84, 85, at the ends of the valve stems 28, 32. The block 9 may be readily removed without disturbing the nuts 15 on the stem of the valve 20, by first removing the cap 2, then withdrawing the stem 4, and then swinging the block 9 about the guide 10 as a center until the hooked projection 13 is out of line with the nuts 16, after which the block 9 can be readily withdrawn from the guide 10.

The lubrication of the valve is accomplished by removing the screw 30 and admitting oil into the pan 11. The lubricant admitted to the pan 11 will be absorbed by the material 12, thus being retained for a considerable time. By forming the block 9 of self-lubricating metal, it is not essential to admit as great an amount of lubricant to the interior of the valve casing as would be necessary if the block 9 was formed of ordinary material.

The packing 5 between the stem 4 and cap 2 can be easily replaced by removing the bolts 3. The spring 24, acting against the lower surface of the stem 4, forces the washer surrounding the stem adjacent the quick pitch screw threads 6 against the packing 5, thereby assisting the air pressure within the cap 2 in forming a tight joint between the stem 4 and cap 2.

It should be understood that it is not desired to be limited to the exact details of construction shown and described, for obvious modifications will occur to a person skilled in the art.

It is claimed and desired to secure by Letters Patent,—

1. In an engineer's valve, a casing, a stem extending into said casing, a valve within said casing, movable means interposed between said stem and valve for operating said valve, a pan mounted on said movable means and a felt matting within said pan.

2. In an engineer's valve, a casing, a stem extending into said casing, a valve within said casing, movable means interposed between said stem and said valve for operating said valve, a receptacle on said movable means, and a lubricant retainer within said receptacle.

3. In an engineer's valve, a casing, a rotatable stem extending into said casing, a valve within said casing, movable means interposed between said stem and said valve, said means being movable along said stem for operating said valve and said means having motion of translation only, a receptacle on said movable means, and a lubricant retainer within said receptacle.

4. In an engineer's valve, an inclosing casing, a stem extending into said casing, a plurality of valves within said casing, and a single element interposed directly between said stem and said valves, said element being movable along said stem to interchangeably open said valves and said valves being movable in the direction of movement of said element.

5. In an engineer's valve, an inclosing casing, a stem extending into and having a screw-threaded portion within said casing, valves having actuating stems within said casing, and a single element coacting directly with said screw-threaded portion of said stem and with said valve actuating stems for interchangeably opening said valves, said valves being closed with said element in mid position.

6. In an engineer's valve, an inclosing casing, a stem extending into and having a screw-threaded portion within said casing, valves having actuating stems within said casing, a single element coacting directly with said screw-threaded portion of said stem and with said valve actuating stems for interchangeably opening said valves, and means for automatically closing said valves, said valves being closed with said element in mid position.

7. In an engineer's valve, a casing, a rotatable stem extending into said casing, a plurality of combined piston and puppet valves within said casing, and a single element interposed directly between said stem and said valves and movable along said stem for interchangeably opening said valves.

8. In an engineer's valve, a casing, a rotatable stem extending into said casing, a plurality of combined piston and puppet valves within said casing, a single element interposed directly between said stem and said valves for interchangeably opening said valves and movable along said stem, and means for automatically closing said valves.

9. In an engineer's valve, a casing, a rotatable stem extending into and having a screw-threaded portion within said casing, two valves having actuating stems within said casing, and a block interposed directly between said screw-threaded portion of said stem and the actuating stems of said valves, said block being adapted to move along said stem by the rotation of said stem, and said block being adapted to interchangeably open said valves, said valves being closed with said block in mid position.

10. In an engineer's valve, a casing, a rotatable stem extending into and having a screw-threaded portion within said casing, two valves having actuating stems within said casing, a block interposed directly between said screw-threaded portion of said stem and the actuating stems of said valves, said block being adapted to move along said stem by the rotation of said stem, and said block being adapted to interchangeably open said valves, and means for automatically closing said valves, said valves being closed with said block in mid position.

11. In an engineer's valve, a casing, a stem having a quick-pitch multiple screw-threaded portion within said casing, means for fixing said stem against movement along its axis, a valve having an actuating portion within said casing, and a block interposed between said screw-threaded portion of said stem and said actuating portion of said valve, said block being movable along said stem to open said valve and said valve being movable in the direction of movement of said block.

12. In an engineer's valve, a casing, a stem having a quick-pitch multiple screw-threaded portion within said casing, means for fixing said stem against movement along its axis, two valves having actuating portions within said casing, and a single block interposed directly between said screw-threaded portion of said stem and said actuating portion of said valve, said block being movable along said stem to interchangeably open said valves and said valves being movable in the direction of movement of said block.

13. In an engineer's valve, a casing, a stem extending into said casing, a valve within said casing, vertically movable means interposed between said stem and said valve for operating said valve, an upwardly open receptacle on said vertically movable means, and a lubricant retainer within said receptacle.

14. In an engineer's valve, an operating stem, a valve member, a block member interposed between said operating stem and said valve member for operating said valve member, and a guide for said block member, one of said members engaging with a recess in the other of said members, disengagement being effected by swinging said block member on said guide.

15. In an engineers's valve, an inclosing casing, a stem extending into said casing, a plurality of valves within said casing, and a single element interposed directly between said stem and said valves, said element being movable along said stem to interchangeably open said valves.

In testimony whereof, I affix my signature in the presence of two witnesses.

HERBERT W. CHENEY.

Witnesses:
CHAS. L. BYRON,
W. H. LIEBER.

Copies of this patent may be obtained for five cents each, by addressing the "Commissioner of Patents, Washington, D. C."

It is hereby certified that in Letters Patent No. 1,116,801, granted November 10, 1914, upon the application of Herbert W. Cheney, of Milwaukee, Wis., for an improvement in "Engineers' Valves," errors appear in the printed specification requiring correction as follows: Page 3, line 97, after the word "valves," insert the words *and movable along said stem;* same page, line 98, strike out the words "and movable along said stem"; and that the said Letters Patent should be read with these corrections therein, that the same may conform to the record of the case in the Patent Office.

Signed and sealed this 15th day of December, A. D., 1914.

[SEAL.]

J. T. NEWTON,
*Acting Commissioner of Patents.*